United States Patent
Oe et al.

(10) Patent No.: US 10,400,719 B2
(45) Date of Patent: Sep. 3, 2019

(54) FLOW RATE MEASURING DEVICE

(71) Applicants: DENSO CORPORATION, Kariya, Aichi-pref. (JP); NIPPON SOKEN, INC., Nishio, Aichi-pref. (JP)

(72) Inventors: Shuhei Oe, Nishio (JP); Masataka Nishikori, Nishio (JP); Kengo Ito, Kariya (JP)

(73) Assignees: DENSO CORPORATION, Kariya (JP); SOKEN, INC., Nishio (JP)

( * ) Notice: Subject to any disclaimer, the term of this patent is extended or adjusted under 35 U.S.C. 154(b) by 247 days.

(21) Appl. No.: 15/375,366

(22) Filed: Dec. 12, 2016

(65) Prior Publication Data

US 2017/0306903 A1  Oct. 26, 2017

(30) Foreign Application Priority Data

Apr. 26, 2016  (JP) .................................. 2016-88116

(51) Int. Cl.
| | |
|---|---|
| *G01F 1/68* | (2006.01) |
| *F02M 35/10* | (2006.01) |
| *G01F 5/00* | (2006.01) |
| *G01F 1/684* | (2006.01) |

(52) U.S. Cl.
CPC ..... *F02M 35/10386* (2013.01); *F02M 35/10124* (2013.01); *G01F 1/6842* (2013.01); *G01F 5/00* (2013.01); *Y02T 10/14* (2013.01)

(58) Field of Classification Search
CPC ....... F02M 35/10386; F02M 35/10262; F02M 35/10124
USPC ........ 73/202, 202.5, 861.61, 114.32–114.35, 73/204.22
See application file for complete search history.

(56) References Cited

U.S. PATENT DOCUMENTS

| | | | | |
|---|---|---|---|---|
| 5,571,964 A | * | 11/1996 | Sawada ................. | G01F 1/6842 73/114.34 |
| 6,234,015 B1 | * | 5/2001 | Hamada ................. | G01F 1/684 73/204.22 |

(Continued)

FOREIGN PATENT DOCUMENTS

| | | | |
|---|---|---|---|
| JP | 2014-119439 A | | 6/2014 |
| JP | 2014119439 A | * | 6/2014 |

OTHER PUBLICATIONS

Bibliographic Data for JP2014119439A, Date: Jun. 30, 2014, Publisher: European Patent Office—Espacenet, pp. 1.*

*Primary Examiner* — Harshad R Patel

(57) ABSTRACT

A flow rate measuring device measures a flow rate of a main flow flowing through a duct. The flow rate measuring device includes a bypass passage, a flow rate sensor, and a measurement body. The measurement body includes a measurement flow inlet opening toward an upstream side of the duct and a cylindrical portion opening toward a downstream side of the duct. The cylindrical portion is disposed to cover the measurement flow outlet. The cylindrical portion includes an outer circumferential surface guiding the main flow and an inner circumferential surface guiding the measurement flow. The cylindrical portion includes a waveform portion formed in an edge side of an opening of the cylindrical. The waveform portion divides the main flow guided by the cylindrical portion into a plurality of main flows and divides the measurement flow guided by the cylindrical portion into a plurality of measurement flows.

8 Claims, 8 Drawing Sheets

(56) References Cited

U.S. PATENT DOCUMENTS

| | | | |
|---|---|---|---|
| 6,272,920 B1 * | 8/2001 | Tank | G01F 1/6842 |
| | | | 73/204.22 |
| 6,360,528 B1 | 3/2002 | Brausch et al. | |
| 8,590,368 B2 * | 11/2013 | Kitahara | G01F 1/6842 |
| | | | 73/204.22 |
| 8,714,000 B2 * | 5/2014 | Sudou | G01M 15/042 |
| | | | 73/204.22 |
| 8,733,159 B2 * | 5/2014 | Tsujii | G01F 1/6842 |
| | | | 73/204.22 |
| 2012/0240668 A1 * | 9/2012 | Goka | G01F 1/6842 |
| | | | 73/114.32 |
| 2013/0008243 A1 | 1/2013 | Tagawa | |
| 2013/0014573 A1 | 1/2013 | Kamiya | |

* cited by examiner

COUNTER FLOW

FIG. 4A
FIG. 4B
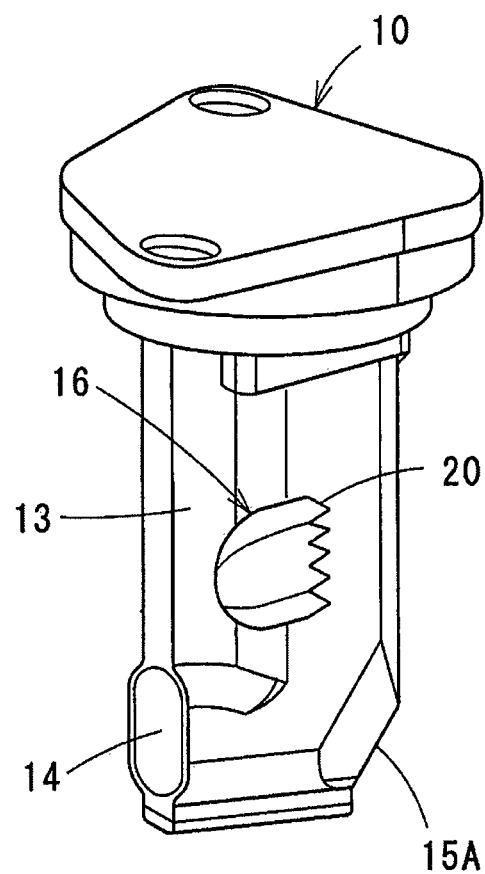
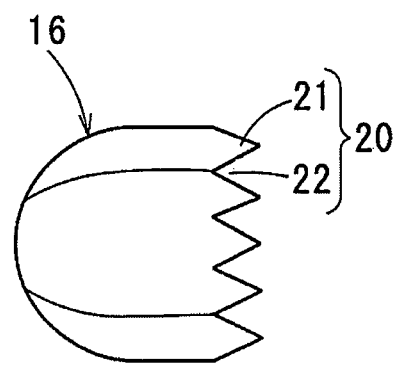

FIG. 5A
FIG. 5B
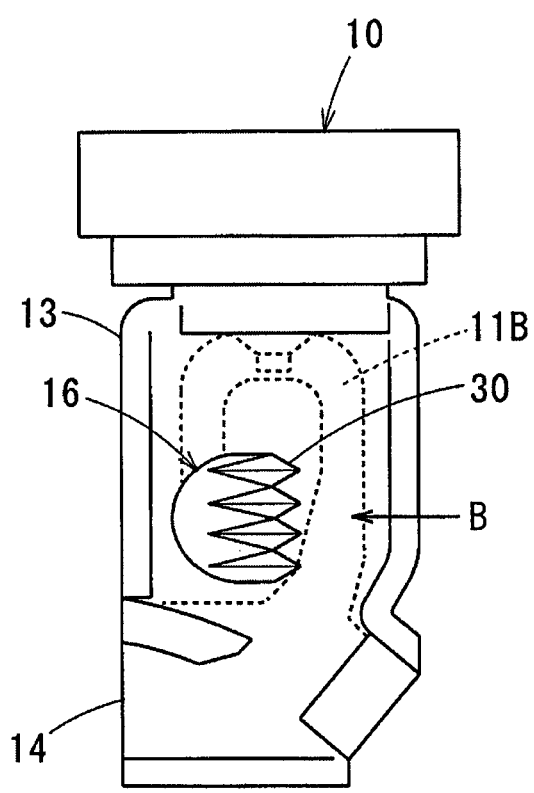
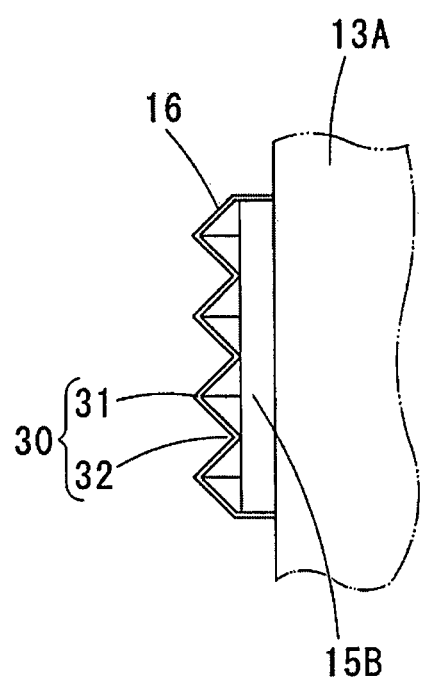

FIG. 9A
FIG. 9B
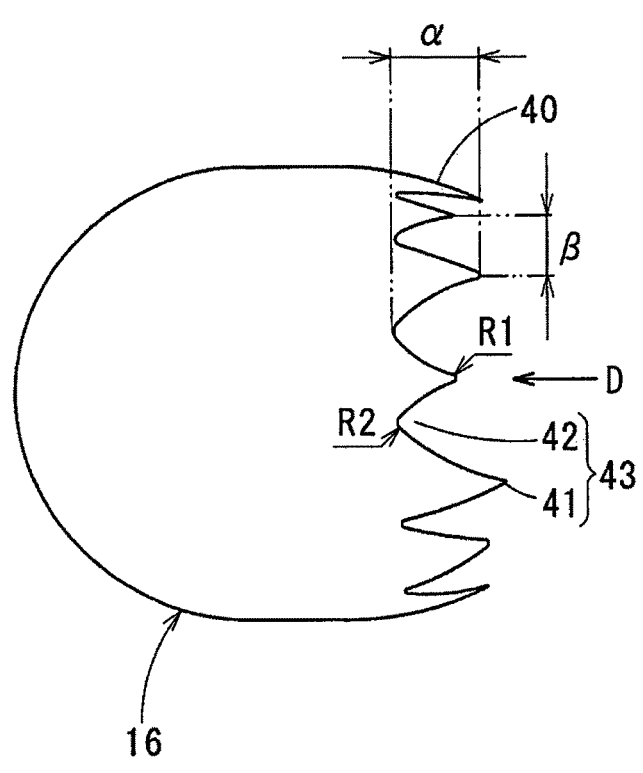
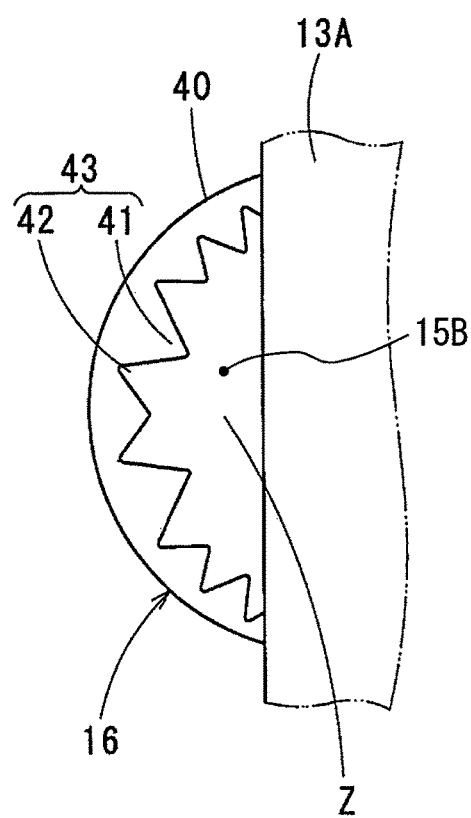

FLOW RATE MEASURING DEVICE

CROSS REFERENCE TO RELATED APPLICATION

This application is based on reference Japanese Patent Application No. 2016-088116 filed on Apr. 26, 2016, the disclosure of which is incorporated herein by reference.

TECHNICAL FIELD

The present disclosure relates to a flow rate measuring device that measures a fluid such as air or mixing gas. More specifically, the present disclosure relates to a flow rate measuring device that is coupled to an intake device for an engine mounted to a vehicle such as an automotive.

BACKGROUND

Conventionally, a device having a variety of structures to detect an amount of an intake air (i.e., a flow rate of an intake air) supplied to an engine is coupled to an intake device for the engine mounted to a vehicle such as an automotive.

A flow rate measuring device is a representative device that is a so-called air flow meter. The flow rate measuring device is disposed in an intake passage between an air cleaner, which draws a fresh air as an intake air, and a throttle body, which controls the flow rate of the intake air. The flow rate measuring device measures a flow rate of the intake air.

The device generally includes a bypass passage, a flow rate sensor, and a measurement body. The bypass passage draws, as a measurement flow, a portion of a main flow (an intake air flow) flowing through an intake passage (hereinafter, may be referred to as a duct as well). The flow rate sensor is disposed in the bypass passage and measures a flow rate of the measurement flow. The measurement body is disposed inside the duct and defines the bypass passage.

The measurement body includes a measurement inlet, a measurement outlet, and a cylindrical portion. The measurement inlet is open toward the upstream side of the duct and guides the measurement flow into the bypass passage. The measurement outlet is open toward the downstream side of the duct and discharges the measurement flow. The cylindrical portion is disposed to cover the measurement outlet and guides the measurement flow.

In the automotive technology field, a demand for improving performance of mounted devices is very high as technology in this field develops. Above all, high accuracy for measurement performance (flow rate measuring function) is strictly requested in the flow rate measuring devices.

In view of this, a variety of modifications or improvements have been conducted to increase the accuracy of measuring a flow rate. For example, (i) changing the shape of the bypass passage to suppress pulsation of the measurement flow or changing the length of the bypass passage, (ii) improving surrounding components around the flow rate measuring device to prevent a counter flow element from entering into the bypass passage, or (iii) devising the structure of a flow rate sensor to increase the accuracy of detection, have been conducted.

However, higher accuracy of measuring function is strongly required toward the flow rate measuring devices as engine performance further increases recently.

In view of the above, it is an objective of the present disclosure to provide a flow rate measuring device that is capable of measuring a flow rate with high accuracy.

SUMMARY

An aspect of the present disclosure provides a flow rate measuring device for measuring a flow rate of a main flow flowing through a duct. The flow rate measuring device includes a bypass passage, a flow rate sensor, and a measurement body.

The bypass passage draws a portion of the main flow as a measurement flow. The flow rate sensor is disposed in the bypass passage. The flow rate sensor measures a flow rate of the measurement flow flowing through the bypass passage. The measurement body is disposed inside the duct and the measurement body defines the bypass passage. The measurement body includes a measurement flow inlet and a cylindrical portion. The measurement flow inlet is open toward an upstream side of the duct. The measurement flow inlet guides the measurement flow to the bypass passage. The measurement flow outlet is open toward a downstream side of the duct to discharge the measurement flow. The cylindrical portion is disposed to cover the measurement flow outlet. The cylindrical portion includes an outer circumferential surface, which guides the main flow, and an inner circumferential surface, which guides the measurement flow.

The cylindrical portion includes a waveform portion that is formed in an edge side of an opening of the cylindrical portion. The waveform portion has a shape that divides the main flow guided by the cylindrical portion into a plurality of main flows and that divides the measurement flow guided by the cylindrical portion into a plurality of measurement flows.

According to the above configurations, the main flow is divided into the plurality of main flows, and the measurement flow is divided into the plurality of measurement flows. Therefore, mixing of the main flow and the measurement flow is facilitated, and swirls generated near the opening of the cylindrical portion are atomized and thus are prevented from combining with each other. Therefore, efficiency of discharging the measurement flow can be improved. Furthermore, the waveform portion at the opening of the cylindrical portion allows a counter flow to be drawn therein. Thus, even when large pulsation occurs in the intake air, high accurate measurement can be performed by effectively (properly) drawing the counter flow element as the measurement flow. Furthermore, the above structure can be easily obtained by changing the structure around the opening of the cylindrical portion.

Therefore, it is possible to provide the flow rate measuring device that has high versatility with low cost and is capable of performing highly accurate measurement.

BRIEF DESCRIPTION OF THE DRAWINGS

The above and other objects, features and advantages of the present invention will become more apparent from the following detailed description made with reference to the accompanying drawings. In the drawings:

FIG. 4A is a perspective view of the air flow meter (the first embodiment);

FIG. 4B is an expanded view of a portion of the air flow meter (the first embodiment);

FIG. 5A is a schematic view of a portion of the air flow meter (the second embodiment);

FIG. 5B is an expanded view of the air flow meter viewed along the arrow B in FIG. 5A (the second embodiment);

FIG. 9A is an enlarged view schematically illustrating a portion of the air flow meter (the sixth embodiment); and FIG. 9B is a view of the air flow meter viewed along the arrow D in FIG. 9A (the sixth embodiment).

DETAILED DESCRIPTION

Figure 1A:
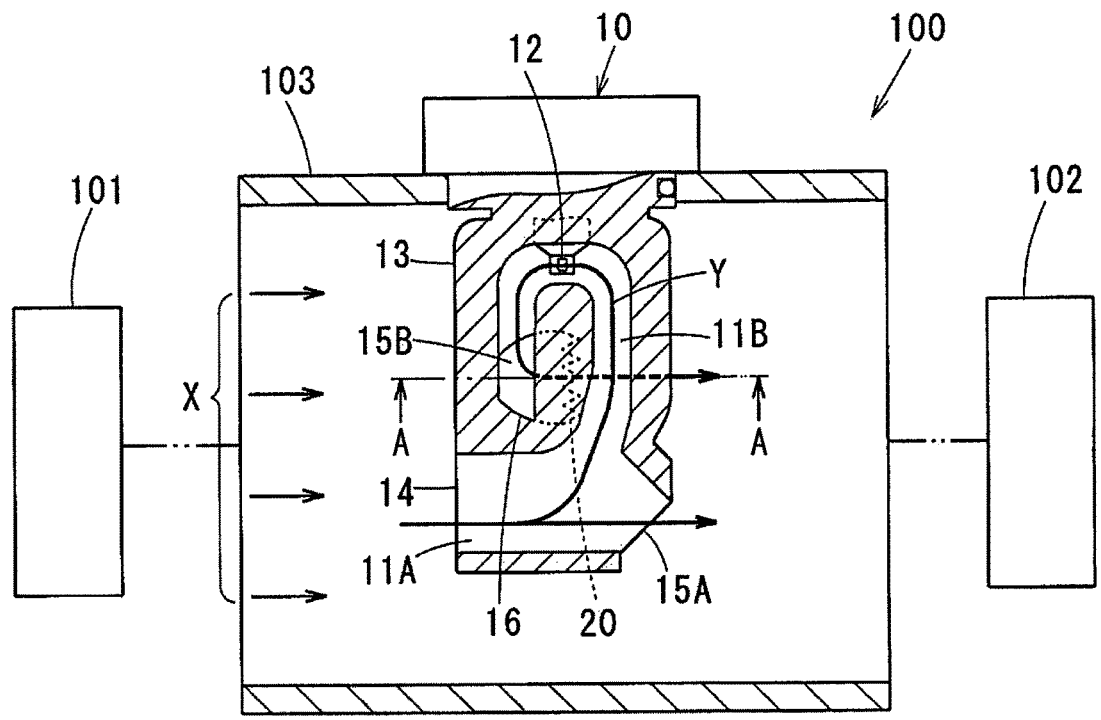
FIG. 1A is a cross-sectional view of a portion of an air flow meter (a flow rate measuring device) when a main flow is in a regular flow state.

The inventors of the present disclosure have conducted a variety of experimental tests to further improve functions of the flow rate measuring device. As a result, the inventors reached a conclusion, by carefully examining a measuring structure from an inlet side to an outlet side of the bypass passage, that there was a room to be improved in the structure around the opening of the cylindrical portion (the measurement flow outlet).

Patent Literature 1 (JP 2013-19674 A) discloses one of examples of an improvement to the structure. Patent Literature 1 provides a solution to suppress a counter flow element due to intake air pulsation to enter into the bypass passage and to obtain only a regular flow element, by setting a barrier to face the cylindrical portion that covers the opening of the bypass passage. As a result, accuracy of measuring performance is improved.

However, the solution by Patent Literature 1 is said to have less applicability to the newest model engine.

For example, an engine using Atkinson cycle has been recently in the limelight as miniaturization was realized. In such an engine, since large pulsation generates in an intake air flow (a main flow), there is need to take effectively (properly) a counter flow element as a measurement flow when measuring a flow rate. Otherwise, an error in an average flow rate would increase and accuracy of measuring a flow rate would deteriorate.

In addition, although the structure of the cylindrical portion covering the measurement flow outlet of the bypass passage was provided to facilitate smooth discharge of the measurement flow, the inventors found that such a structure had less contribution to the smooth discharge.

The inventors further conducted experimental tests to find the cause of the less contribution, and eventually reached to a conclusion that since a large swirl was generated near the opening of the cylindrical portion and the large swirl went around toward the opening (a counter flow occurs apparently), discharge of the measurement flow from the opening is obstructed by the large swirl. Furthermore, the inventors found out the mechanism of generating the large swirl was based on following reasons.

According to flow analysis, the outer circumferential surface of the cylindrical portion guided the main flow and the inner circumferential surface of the cylindrical portion guided the measurement flow. Because a flow speed difference between the main flow and the measurement flow generated, swirls were generated by a rotational force due to the flow speed difference near the opening of the cylindrical portion. The swirls generated aligned in a straight line along a surface of the cylindrical portion near the opening, and then were combined with each other into a larger swirl.

Although this counter flow problem may be solved by using the barrier as described above, since the counter flow element cannot be taken properly as a measurement flow, this solution could not be a fundamental solution that can perfectly solve the problem.

Furthermore, the inventors confirmed that a chevron structure had been used in the aircraft industry as a measure for reducing noise in an exhaust nozzle (a cylindrical portion) of a gas turbine.

As shown in Patent Literature 2 (JP H11-166451 A), the exhaust nozzle has a waveform portion around an opening where the outer circumferential surface and the inner circumferential surface of the waveform portion. By the waveform portion, a first flow guided by the outer circumferential surface of the nozzle is divided into a plurality of first flows and a second flow guided by the inner circumferential surface of the nozzle is divided into a plurality of second flows. As a result, the mixing of the first and second flows is facilitated, whereby the noise can be reduced.

Thus, the inventors paid attention to the facts that the noise reduction of the nozzle was closely related to the mechanism of the swirls and that the atomization of the swirls gave rise to the noise reduction.

In view of the above findings, the inventors developed the present disclosure and, and a plurality of embodiments of the present disclosure will be described with reference to drawings below. In the following embodiments, an air flow meter that is coupled to an intake device for an engine mounted to a vehicle is used as one example of the flow rate measuring device of the present disclosure.

Initially, a basic structure of the intake device of the engine and the position (i.e. the role) of the air flow meter in the intake device will be described.

It is needless to say that the embodiments are some examples of the present disclosure, and therefore the present disclosure is not limited to these embodiment. Furthermore, each of the substantially same structures among the embodiments will be assigned to the respective common referential numeral and the description of the substantially same structures will be omitted in the subsequent embodiments.

The entire structure of the intake device of the engine and the role of the air flow meter in the intake device will be described with reference to FIGS. 1 and 2.

The intake device 100 draws a fresh air from an air cleaner 101, controls a flow rate of the fresh air by a throttle body 102 according to operating conditions, and then supplies the fresh air at the controlled flow rate to the engine.

The air flow meter 10 serves as flow rate measuring means to detect (measure) a flow rate of the intake air. The air flow meter 10 is positioned between the air cleaner 101 and the throttle body 102. More specifically, the air flow meter 10 is disposed in a duct 103 defining an intake passage.

The air flow meter 10 includes a bypass passage 11, a flow rate sensor 12, and a measurement body 13 and detects a flow rate of an intake air (hereinafter, referred to as a "main flow X") flowing through the duct 103. The bypass passage 11 draws a portion of the main flow X therein as a measurement flow Y. The flow rate sensor 12 is disposed in the bypass passage 11 and measures a flow rate of the measurement flow Y flowing through the bypass passage 11. The measurement body 13 is arranged inside the duct 103 and defines the bypass passage 11 therein.

The measurement body 13 includes an inlet 14, an outlet 15, and cylindrical portions 16. The inlet 14 is open toward the upstream side of the duct 103 and draws a portion of the main flow X into the bypass passage 11. The outlet 15 is open toward the downstream side of the duct 103 and discharges the drawn bypass flow. The cylindrical portions 16 are disposed to cover measurement flow outlets 15B of the outlet 15, which will be described later, that discharges the measurement flow Y.

The bypass passage 11 is formed of two passages. The first passage is a straight passage 11A that linearly extends from the inlet 14 open toward the upstream side of the main flow X, guides the intake air to flow linearly in the same direction as the main flow X, and discharges the intake air through the outlet 15 (a dust outlet 15A described below). The second passage is a round passage that branches off from the straight passage 11A and causes the intake air linearly flowing through the straight passage 11A to bypass the straight passage 11A and guides the intake air toward the downstream side.

The flow rate sensor 12 is disposed at the deepest position of the round passage 11B that is furthest away from the straight passage 11A. The flow rate sensor 12 detects the measurement flow Y flowing through the round passage 11B.

Although only one inlet 14 is formed in the measurement body 13 to be commonly used as a measurement flow inlet, the outlet 15 is substantially formed of two parts. That is, the first outlet serves as the dust outlet 15A that is an outlet of the straight passage 11A to discharge dusts therethrough, and the second outlet serves as measurement flow outlets 15B that are outlets of the round passage 11B and discharge the measurement flow Y.

It should be noted that the round passage 11B is divided into two passages at a downstream side of the round passage 11B. As shown in FIG. 3B, the measurement flow outlets 15B are formed as two openings and a main body 13A is interposed between the two openings.

Each of the cylindrical portions 16 is means for facilitating discharge of the measurement flow Y and is disposed to cover the corresponding measurement flow outlet 15B. Each of the cylindrical portions 16 covers the each of the measurement flow outlets 15B and is open toward the downstream side of the main flow X (see FIG. 3B).

As described above, the flow rate sensor 12 is not directly arranged in the main flow X of the duct 103 but is arranged in the round passage 11B of the bypass passage 11. Therefore, the air flow meter 10 does not directly receive effects such as turbulence of the intake air and dusts in the duct 103, and thus the air flow meter 10 can output measured values with less dispersion.

At the opening side of the round passage 11B of the bypass passage 11, each of the measurement flow outlets 15B to discharge the measurement flow Y is covered by the cylindrical portion 16 that is open toward the downstream side. Therefore, discharge of the measurement flow Y is smoothly performed, and thus accuracy of the measured value would be expectedly improved.

Furthermore, the air flow meter 10 as described below in the following embodiments is configured such that a large swirl is prevented from generating around the opening of each of the cylindrical portions 16.

Next, with reference to FIGS. 3 to 9, first to sixth embodiments will be described in order.

First Embodiment

Figure 3A:
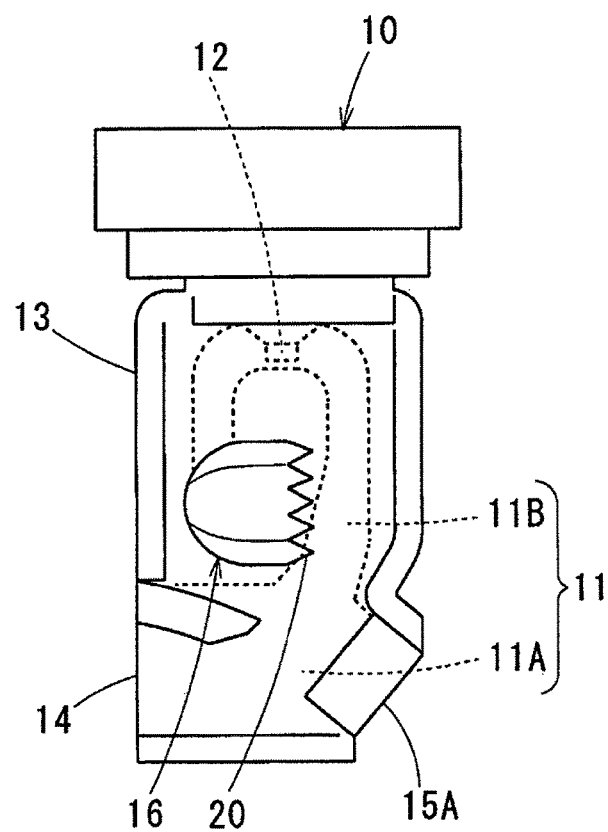
FIG. 3A is a front view of the air flow meter (the first embodiment)
Figure 3B:
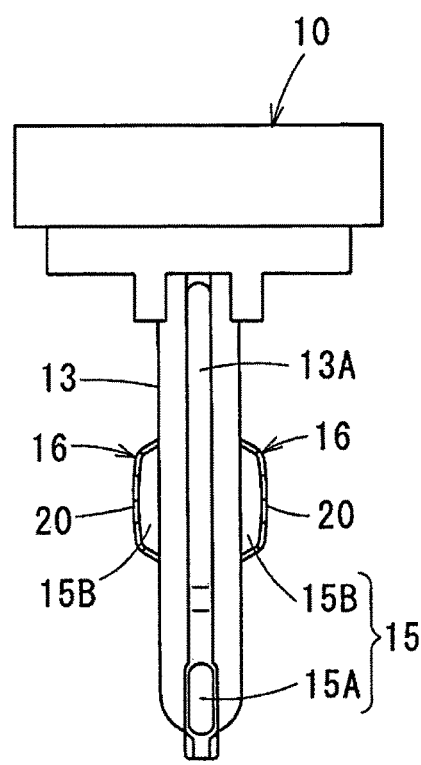
FIG. 3B is a right-side view of the air flow meter (the first embodiment)

Referring to FIGS. 3 and 4, the first embodiment will be described.

As described above, each of the measurement flow outlets 15B that discharges the measurement flow Y is covered by the cylindrical portion 16. Each of the cylindrical portions 16 includes a crown shape portion 20, as a waveform portion, that is formed in an edge side of an opening of the cylindrical portion, as shown in FIG. 4B.

The crown shape portion 20 includes a plurality of protrusions 21, each of which has a triangular shape and protrudes in the axial direction, i.e., toward the downstream side of the duct 103, and a plurality of recessed portions 22, each of which has a triangular shape and is recessed in the axial direction. The protrusions 21 and the recessed portions 22 are alternately arranged and connected to each other along a circumferential direction of the cylindrical portion 16. The recessed portions 22 form openings between the protrusions 21 radially passing through the inner circumferential surface and the outer circumferential surface of the cylindrical portion 16.

Therefore, by the protrusions 21 and the recessed portion 22, the inner circumferential surface and the outer circumferential surface of the cylindrical portion 16 near the opening thereof form a jagged waveform pattern.

Figure 1B:
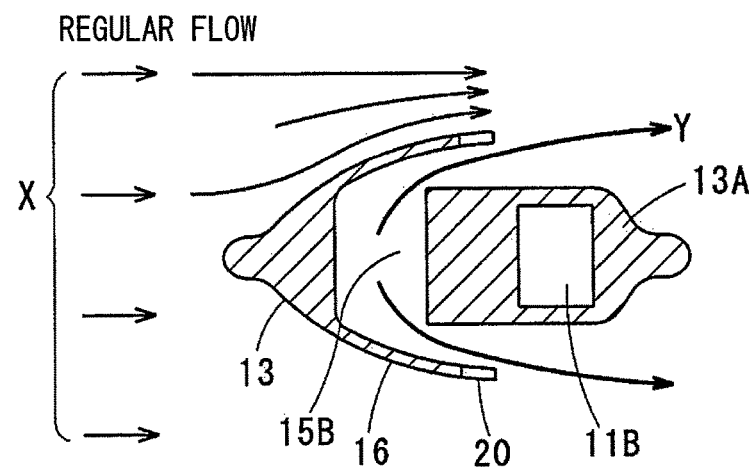
FIG. 1B is a cross-sectional view taken along A-A line in FIG. 1A.

According to the above configurations, when the main flow X is in a regular flow state where the main flow X flows from the upstream side to the downstream side as shown in FIG. 1, the main flow X is guided by the outer circumferential surface of the cylindrical portion 16 and the measurement flow Y is guided by the inner circumferential surface. At this point, the main flow X is divided into a plurality of main flows and the measurement flow Y is divided into a plurality of measurement flows, by the protrusions 21 and the recessed portion 22 of the crown shape portion 20.

Accordingly, even if a flow speed difference between the main flow X and the measurement flow Y is generated, and even if swirls are generated around the opening of the cylindrical portion 16 by a rotational force due to the flow speed difference, mixing of the main flow X and the measurement flow Y is facilitated because of the division of the main flow X and the measurement flow Y by the crown shape portion 20, and therefore the swirls are prevented from combining with each other.

Hence, the measurement flow Y can be smoothly discharged from the measurement flow outlets 15B through the cylindrical portions 16 without intervention by the swirls, and thus accuracy of measured values can be increased.

Figure 2A:
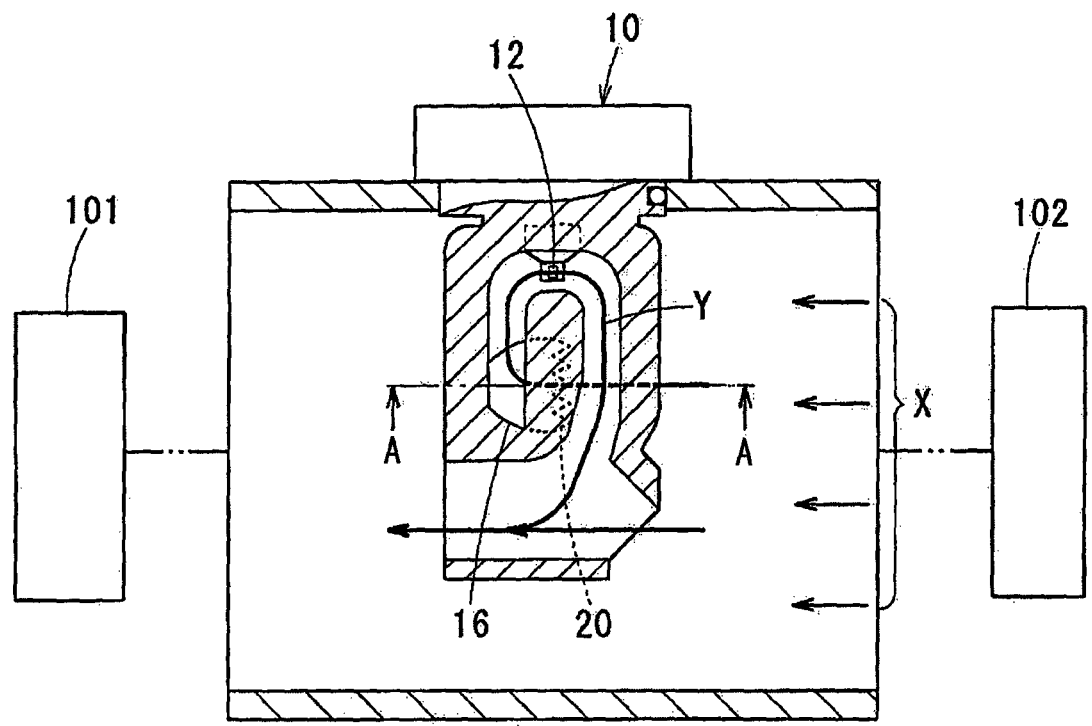
FIG. 2A is a cross-sectional view of the portion of the air flow meter when a main flow is a counter flow state.
Figure 2B:
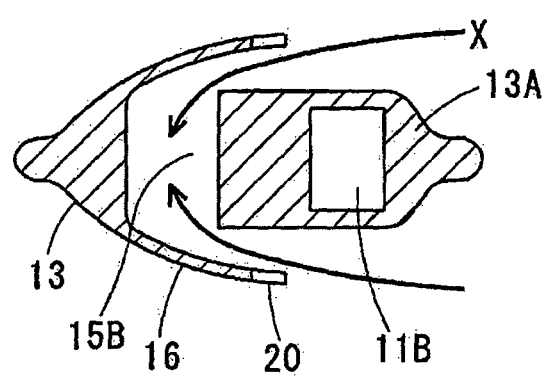
FIG. 2B is a cross-section taken along A-A line in FIG. 2A.

On the contrary, when the main flow X in a counter flow state where the main flow X flows from the downstream side to the upstream side due to large pulsation of an intake air as shown in FIG. 2, the main flow X flows toward the opening of each of the cylindrical portions 16. In this case, the opening of the cylindrical portion 16 is fully open toward the downstream side without intervention by the crown shape portion 20. Hence, a counter flow element can be drawn into the bypass passage 11 (the round passage 11B) from the measurement outlets 15B as the measurement flow Y.

Therefore, when such a counter flow occurs, the counter flow element can be properly drawn into the bypass passage 11 (the round passage 11B), thereby obtaining the measurement flow Y with a less flow rate error regardless of the existence of the crown shape portion 20. As a result, high accuracy measurement can be performed.

According to the first embodiment, following effects can be achieved.

The crown shape portion 20 is formed in the edge side of the opening of the cylindrical portion 16 and partially passes through the inner circumferential surface and the outer circumferential surface through the recessed portions 22 in the radial direction. The main flow X guided by the outer circumferential surface of the cylindrical portion 16 is divided into the plurality of main flows by the crown shape portion 20, and the measurement flow Y guided by the inner circumferential surface of the cylindrical portion 16 is divided into the plurality of measurement flows by the crown shape portion 20. Therefore, the mixing of the main flow X and the measurement flow Y is facilitated, and the swirls generated near the opening of the cylindrical portion 16 are atomized. Thus, the swirls are prevented from combining with each other. Therefore, efficiency of discharging the measurement flow Y can be improved.

Furthermore, the crown shape portion 20 is formed of the protrusions 21 and the recessed portions 22 to have the waveform shape having no effect on drawing of the counter flow. Thus, when large pulsation occurs in the intake air (the main flow X), high accuracy measurement can be performed by effectively drawing the counter flow element as the measurement flow Y.

Furthermore, the above structure can be easily obtained by shaping the edge side of the opening of the cylindrical portion 16 into the crown shape portion 20. Especially, the body 13 is formed of plastic, and therefore the crown shape portion 20 can be formed together with the cylindrical portion 16 at the same time, which results in reducing manufacturing cost.

Therefore, it is possible to provide the air flow meter (the flow rate measuring device) 10 that has high versatility with low cost and is capable of perform highly accurate measuring function.

Second Embodiment

Next, the second embodiment will be described with reference to FIG. 5.

In the present embodiment, each of the cylindrical portions 16 includes a chrysanthemum shape portion 30, as the waveform portion, near the edge side of the opening of the cylindrical portion 16, as shown in FIGS. 5A and 5B. The chrysanthemum shape portion 30 includes a plurality of protrusions 31, which protrude in a radial direction, i.e., in a direction perpendicular to the discharging direction (the downstream side of the duct 103), and a plurality of recessed portions 32, which are recessed in the radial direction. Each of the protrusions 31 has a trigonal pyramid shape gradually expanding toward the opening side. Each of the recessed portions 32 has a trigonal pyramid shape gradually expanding toward the opening side. The protrusions 31 and the recessed portions 32 are alternately connected to each other. By the chrysanthemum shape portion 30, the inner circumferential surface and the outer circumferential surface of the cylindrical portion 16 form a jagged waveform pattern.

According to the above configurations, a plurality of passages are formed on both the inner circumferential surface and the outer circumferential surface around the edge side of the opening of the cylindrical portion 16. Thus, when the main flow X flows from the upstream side to the downstream side as shown in FIG. 1, the outer circumferential surface of the cylindrical portion 16 guides the main flow X and the inner circumferential surface of the cylindrical portion 16 guides the measurement flow Y. At this point, the main flow X is divided into a plurality of main flows by the plurality of passages of the chrysanthemum shape portion 30, and the measurement flow Y is divided into a plurality of measurement flows by the plurality of passages of the chrysanthemum shape portion 30. Hence, mixing of the main flow X and the measurement flow Y is facilitated, and as a result, the swirls are prevented from combining with each other into a larger swirl.

On the contrary, when the main flow X flows from the downstream side to the upstream side by large pulsation of the intake air as shown in FIG. 2, the main flow X flows toward the opening of each of the cylindrical portions 16. In this case, the opening of each of the cylindrical portions 16 is fully open toward the downstream side by the chrysanthemum shape portion 30 formed of the protrusions 31 and the recessed portions 32. Thus, a counter flow element can be drawn, as the measurement flow Y, into the bypass passage 11 (the round passage 11B) from the measurement flow outlets 15B without intervention by the chrysanthemum shape portions 30.

Therefore, smooth discharge of the measurement flow Y and proper drawing of the counter flow element can be performed at the same time, and thus high accuracy measurement of the flow rate can be achieved.

Furthermore, the plurality of passages are formed on both the inner circumferential surface and the outer circumferential surface around the edge side of the opening of each of the cylindrical portions 16. Thus, the division of the main flow X and the measurement flow Y is more effectively performed as compared to the first embodiment, and therefore the swirls can be more effectively prevented from combining with each other.

Third Embodiment

Figures 6A, 6B:
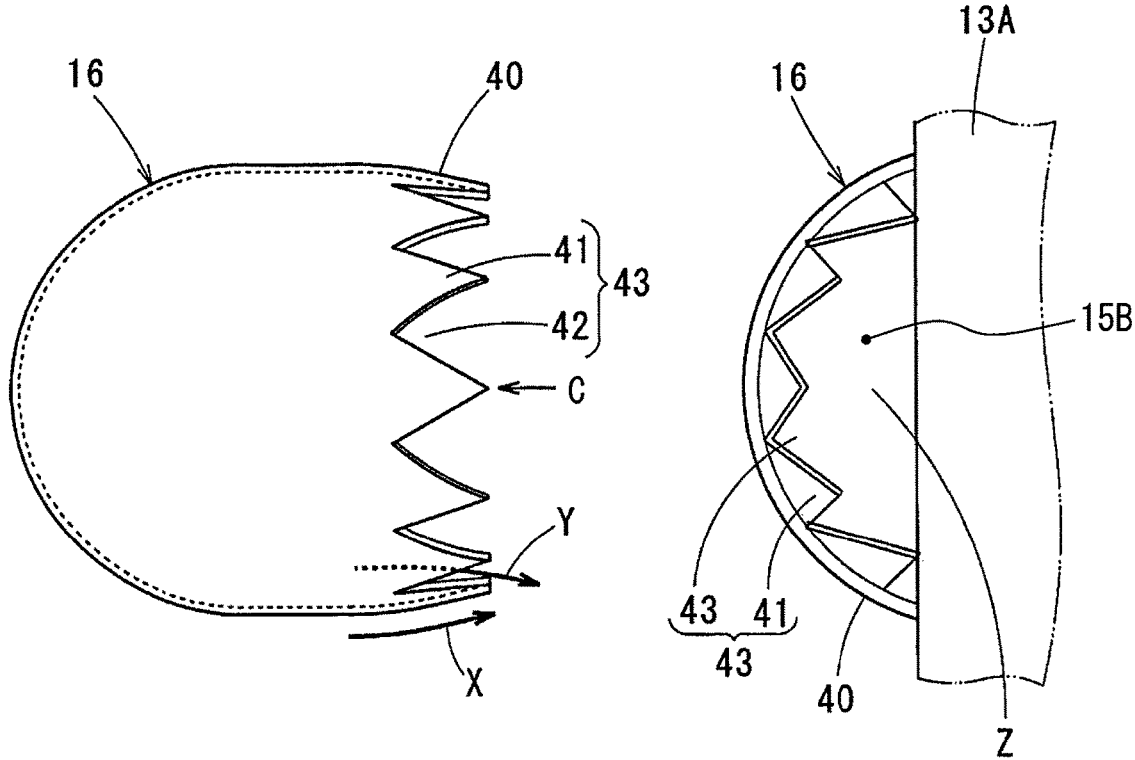
FIG. 6A is an expanded view schematically illustrating a portion of the air flow meter (the third embodiment)
FIG. 6B is a diagram of the air flow meter viewed along the arrow C in FIG. 6A (the third embodiment)

Next, the third embodiment will be described with reference to FIG. 6. In the present embodiment, as shown in FIGS. 6A and 6B, each of the cylindrical portions 16 includes a throttle crown shape portion 40, as a waveform portion, at the edge side of the opening of the cylindrical portion 16. The inner circumferential surface and the outer circumferential surface of the throttle crown shape portion 40 form a jagged waveform pattern.

The throttle crown shape portion 40 includes a plurality of protrusions (recessed portions) that are arranged in the axial direction and the radial direction to have a three-dimensional waveform. That is, as with the first embodiment, the throttle crown shape portion 40 has a basic structure with the waveform portion formed by arranging alternately the plurality of protrusions 41 and the plurality of recessed portion 42 in the circumferential direction. Each of the protrusions 41 protrudes in the axial direction, i.e., toward the downstream side of the duct 103, and has a triangular shape, and each of the recessed portions 42 is recessed in the axial direction and has a triangular shape. In addition, the throttle crown shape portion 40 further includes a throttle 43 that is formed by bending the end portion of the waveform portion radially inward of the cylindrical portion 16.

The throttle 43 narrows substantially an opening area Z of the measurement outlet 15B in a proper manner. Thus, the throttle 43 can properly adjust discharging function of the measurement flow Y and drawing function of the counter flow element.

According to the above described configurations, each of the cylindrical portions 16 includes the throttle crown shape portion 40 having the throttle 43 at the edge side of the opening of the cylindrical portion 16. By the throttle 43, discharging function of the measurement flow Y and drawing function of the counter flow element can be properly adjusted at the same time. As a result, greater effects more than the first and second embodiments can be achieved.

Next, modifications to the first or third embodiment will be described as fourth to sixth embodiments with reference to FIGS. 7 to 9. In the embodiments illustrated in FIGS. 7 and 8, the structure of the cylindrical portion 16 will be specifically described.

Fourth Embodiment

Figure 7:
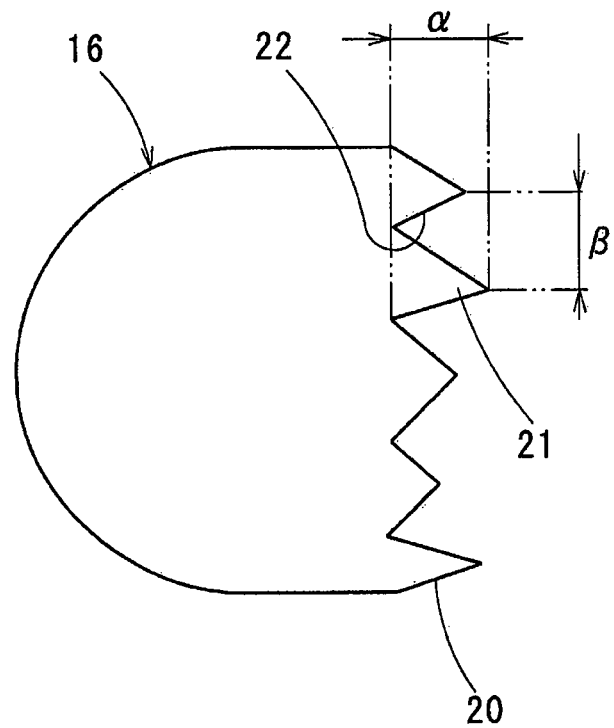
FIG. 7 is an enlarged view schematically illustrating a portion of the air flow meter (the fourth embodiment)

In the fourth embodiment, the waveform portion formed at the edge side of the opening of each of the cylindrical portion 16 is formed by randomly arranging the plurality of protrusions and the plurality of recessed portions with different shapes and dimensions at different intervals (different pitches), which is illustrated in FIG. 7.

In the present embodiment, the waveform portion as described in the first embodiment (the crown shape portion 20 formed in the edge side of the opening of the cylindrical portion 16) is structurally modified by changing the height α of each of the protrusions 21 and by changing the distance (the pitch) β between the two neighboring protrusions 21 along the circumferential direction.

According to the above described configurations, each of the main flow X and the measurement flow Y can be properly adjusted by setting the different pitches and shapes of the protrusions 21 and the recessed portions 22. Therefore, robustness to a variety of flow speeds can be improved.

Fifth Embodiment

Figure 8:
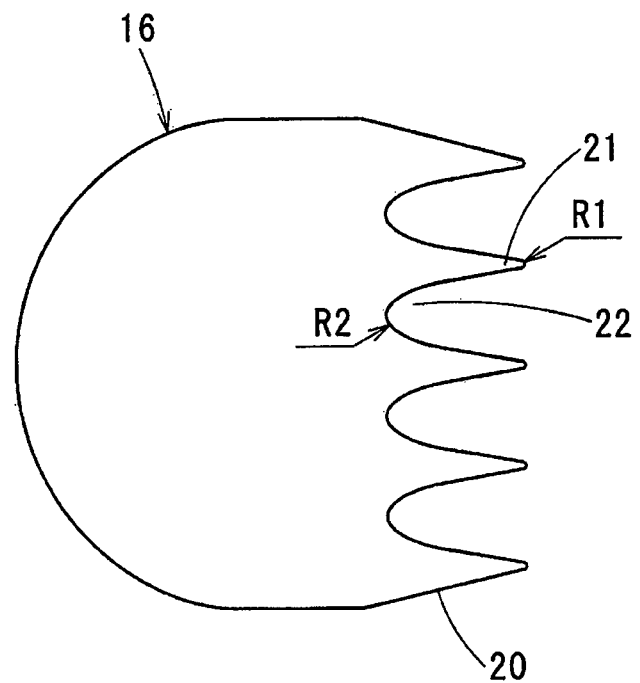
FIG. 8 is an enlarged view schematically illustrating a portion of the air flow meter (the fifth embodiment)

In the fifth embodiment, the waveform portion formed at the edge side of the opening of the cylindrical portion 16 is formed considering swirl suppression effects and strength of the cylindrical portion 16, which is illustrated in FIG. 8.

In the present embodiment, the waveform portion as described in the first embodiment (the crown shape portion 20 formed in the edge side of the opening of the cylindrical portion 16) is structurally modified by forming an apex of each of the protrusions 21 in a shape that is different from the shape of a depth point of each of the recessed portions 22. More specifically, the apex of each of the protrusions 21 has a curved shape, and the depth point of each of the recessed portion 22 has a curved shape. The apex of each of the protrusions 21 has a radius of curvature that is set to be different from a radius of curvature of the depth point of each of the recessed portions 22.

More specifically, a radius of curvature of the apex of each of the protrusions 21 is defined as R1, and a radius of curvature of the depth point of each of the recessed portions 22 is defined as R2. In the present embodiment, R1 and R2 are set to satisfy R1<R2.

Accordingly, the apex of the protrusion 21 is more acute than the depth point of the recessed portion 22, which leads to improvement of swirl suppression effects. Further, a larger chamfer with a large angle can be secured at a root portion (i.e., the depth point of the recessed portion 22) of each of the protrusions 21, and thus the strength of each of the protrusions 21 can be enhanced.

Sixth Embodiment

Next, the sixth embodiment will be described with reference to FIG. 9. As shown in FIGS. 9A and 9B, the waveform portion described in the third embodiment (the throttle crown shape portion 40 formed in the edge of the opening of the cylindrical portion 16) is used as a basic structure, and further the above described structures presented in the fourth and fifth embodiments are included. The throttle 43 is formed of a plurality of protrusions 41 and a plurality of recessed portions 42. Each of the protrusions 41 (the recessed portions 42) has a different height α and the pitch β between one pair of two protrusions 41 is different from the pitch β between another pair of two protrusions 41. Furthermore, each of the protrusions 41 has a radius of curvature R1 that is different from a radius of curvature R2 of each of the recessed portions 42.

According to the present embodiment, synergistic effects by combining effects obtained from the first to third embodiments can be expected.

Next, modifications to embodiments will be described below.

In the above-described embodiments, the waveform portion formed at the opening of the cylindrical portion 16 is not necessarily limited to the number of the protrusions and the recessed portions as illustrated in the drawings, as long as the plurality of protrusions and the plurality of recessed portions are arranged along the circumferential direction.

Furthermore, the shapes of the protrusions and the recessed portions can be changed according to required performance for each device type.

For example, the chrysanthemum shape portion 30 in the second embodiment may be changed so that each of the protrusions 31 has a different shape and pitch and each of the recessed portions 32 has a different shape and pitch, as with the fourth embodiment. Further, the chrysanthemum shape portion 30 may have a radius of curvature R1 of each of the protrusions 31 and a radius of curvature R2 of each of the recessed portions 32 so that the radius of curvature R1 is different from the radius of curvature R2, as with the fifth embodiment.

In the described embodiments, the measurement flow outlet 15B of the round passage 11B is divided into the two passages. However, the measurement outlet 15B may be formed of one passage or three or more passages.

Furthermore, a so-called sub-bypass type air flow meter where the bypass passage 11 is formed of the straight passage 11A and the round passage 11B is used as the air flow meter 10. However, the air flow meter 10 may be formed of only the round passage 11B without the straight passage 11A.

In the above-described embodiments, the present disclosure is applied to the air flow meter for measuring a flow rate of intake air. However, the present disclosure may be applied to a flow rate measuring device for measuring a flow rate of EGR gas, or other fluid.

The cylindrical portion 16 includes the waveform portion, as the crown shape portion 20, formed of the plurality of protrusions 21, which protrude toward the downstream side of the duct 103 in the radial direction, and the plurality of recessed portions 22, which are recessed in the radial direction. The plurality of protrusions 21 and the plurality of recessed portions 22 are alternately connected to each other in the circumferential direction (refer to the first embodiment).

According to the above configurations, the edge side of the opening of the cylindrical portion 16 provides the crown shape portion 20. Thus, the main flow X guided by the outer circumferential surface of the cylindrical portion 16 is divided into the plurality of main flows by the crown shape portion 20, and the measurement flow Y guided by the inner circumferential surface of the cylindrical portion 16 is divided into the plurality of measurement flows by the crown shape portion 20. Therefore, the swirls generated near the opening of the cylindrical portion 16 are atomized and are prevented from combining with each other. Therefore, the efficiency of discharging the measurement flow Y can be improved.

Furthermore, the crown shape portion 20 has the waveform shape which is capable of drawing the counter flow element therein. Thus, when large pulsation occurs in the intake air (the main flow X), high accuracy measurement can be performed by effectively drawing the counter flow element therein as the measurement flow Y.

The waveform portion of the cylindrical portion 16 provides the chrysanthemum shape portion 30 formed of a plurality of protrusions 31, which protrude in the radial direction, and a plurality of recessed portions 32, which are recessed in the radial direction. The plurality of protrusions 31 and the plurality of recessed portions 32 are alternately connected to each other.

The main flow X is divided into a plurality of main flows by the plurality of passages of the chrysanthemum shape portion 30, and the measurement flow Y is divided into a plurality of measurement flows by the plurality of passages of the chrysanthemum shape portion 30. Hence, the swirls are prevented from combining with each other.

Especially, the plurality of passages are formed on both the inner circumferential surface and the outer circumferential surface at the edge side of the opening of the cylindrical portion 16. Thus, the division of the main flow X and the measurement flow Y is more effectively performed as compared to the first embodiment, and therefore the swirls can be more effectively prevented from combining with each other.

The cylindrical portion includes an end portion that is bent radially inward of the cylindrical portion 16 to form the throttle 43 that narrows the opening area Z of the measurement flow outlet 15B (refer to the third and sixth embodiments).

According to the above described configurations, the cylindrical portion 16 includes the throttle crown shape portion 40 having the throttle 43 at the edge side of the opening of the cylindrical portion 16. By the throttle 43, discharging function of the measurement flow Y and drawing function of the counter flow element can be properly adjusted. As a result, greater effects more than the first and second embodiments can be achieved.

The plurality of protrusions 21, 31, 41 have different shapes from each other, and the plurality of recessed portions 22, 32, 42 have different shapes from each other (refer to the fourth and sixth embodiments and the third modification).

According to the above described configurations, each of the main flow X and the measurement flow Y can be properly adjusted. Therefore, robustness to a variety of flow speeds can be improved.

Each of the plurality of protrusions 21, 31, 41 includes an apex having a curved shape, and each of the plurality of recessed portions 22, 32, 42 includes a depth point having a curved shape. The depth point has a radius of curvature R2 greater than a radius of curvature R1 of the apex (refer to the fifth and sixth embodiments and the third modification).

Accordingly, the apex of the protrusion 21, 31, 41 is more acute than the depth point of the recessed portion 22, 32, 42, which leads to improvement of swirl suppression effects. Furthermore, a larger chamfer with a large angle can be secured at a root portion (i.e., the depth point of the recessed portion 22, 32, 42) of each of the protrusions 21, 31, 41, and thus strength of each of the protrusions 21, 31, 41 can be enhanced.

What is claimed is:

1. A flow rate measuring device for measuring a flow rate of a main flow flowing through a duct, the flow rate measuring device comprising:
    a passage that takes in a portion of the main flow flowing through the duct;
    a bypass passage that is branched off from the passage and draws a portion of the main flow flowing through the passage as a measurement flow;
    a flow rate sensor that is disposed in the bypass passage, the flow rate sensor measuring a flow rate of the measurement flow flowing through the bypass passage; and
    a measurement body that is disposed inside the duct, the measurement body defining the bypass passage, wherein
    the measurement body includes:
        a measurement flow inlet that is open toward an upstream side of the duct, the measurement flow inlet guiding the measurement flow to the bypass passage;
        a measurement flow outlet that is open toward a downstream side of the duct to discharge the measurement flow; and
        a cylindrical portion that is disposed to cover the measurement flow outlet, the cylindrical portion including an outer circumferential surface, which guides the main flow, and an inner circumferential surface, which guides the measurement flow,
    the cylindrical portion includes a waveform portion that is formed in an edge side of an opening of the cylindrical,
    the waveform portion has a shape that divides the main flow guided by the cylindrical portion into a plurality of main flows and that divides the measurement flow guided by the cylindrical portion into a plurality of measurement flows,
    the waveform portion is formed of
        an axial protrusion that protrudes toward the downstream side of the duct in the axial direction,
        an axial recessed portion that is recessed toward the upstream side of the duct in the axial direction,
        a radial protrusion that protrudes in the radial direction, and
        a radial recessed portion that is recessed in the radial direction,
    the axial protrusion and the axial recessed portion are adjacent to and connected to each other, and
    the radial protrusion and the radial recessed portion are adjacent to and connected to each other.

2. The flow rate measuring device according to claim 1, wherein
    the axial protrusion is one of a plurality of axial protrusions, which protrude toward the downstream side of the duct in the axial direction,
    the axial recessed portion is one of a plurality of axial recessed portions, which are recessed in the axial direction, and
    the plurality of axial protrusions and the plurality of axial recessed portions are alternately connected to each other.

3. The flow rate measuring device according to claim 2, wherein
    each of the plurality of axial protrusions includes an apex having a curved shape, each of the plurality of axial recessed portions includes a depth point having a curved shape, and
the depth point has a radius of curvature greater than a radius of curvature of the apex.

4. The flow rate measuring device according to claim 1, wherein
the radial protrusion is one of a plurality of radial protrusions, which protrude in the radial direction,
the radial recessed portion is one of a plurality of radial recessed portions, which are recessed in the radial direction, and
the plurality of radial protrusions and the plurality of radial recessed portions are alternately connected to each other.

5. The flow rate measuring device according to claim 4, wherein
the plurality of radial protrusions have different shapes from each other, and
the plurality of radial recessed portions have different shapes from each other.

6. The flow rate measuring device according to claim 4, wherein
each of the plurality of radial protrusions includes an apex having a curved shape,
each of the plurality of radial recessed portions includes a depth point having a curved shape, and
the depth point has a radius of curvature greater than a radius of curvature of the apex.

7. A flow rate measuring device for measuring a flow rate of a main flow flowing through a duct, the flow rate measuring device comprising:
a bypass passage that draws a portion of the main flow as a measurement flow;
a flow rate sensor that is disposed in the bypass passage, the flow rate sensor measuring a flow rate of the measurement flow flowing through the bypass passage; and
a measurement body that is disposed inside the duct, the measurement body defining the bypass passage, wherein
the measurement body includes:
a measurement flow inlet that is open toward an upstream side of the duct, the measurement flow inlet guiding the measurement flow to the bypass passage;
a measurement flow outlet that is open toward a downstream side of the duct to discharge the measurement flow; and
a cylindrical portion that is disposed to cover the measurement flow outlet, the cylindrical portion including an outer circumferential surface, which guides the main flow, and an inner circumferential surface, which guides the measurement flow,
the cylindrical portion includes a waveform portion that is formed in an edge side of an opening of the cylindrical,
the waveform portion has a shape that divides the main flow guided by the cylindrical portion into a plurality of main flows and that divides the measurement flow guided by the cylindrical portion into a plurality of measurement flows,
the waveform portion is formed of a plurality of protrusions, which protrude toward the downstream side of the duct in the axial direction, and a plurality of recessed portions, which are recessed in the axial direction,
the plurality of protrusions and the plurality of recessed portions are alternately connected to each other, and
the waveform portion includes an end portion that is bent radially inward of the cylindrical portion to form a throttle that narrows an opening area of the measurement flow outlet.

8. A flow rate measuring device for measuring a flow rate of a main flow flowing through a duct, the flow rate measuring device comprising:
a bypass passage that draws a portion of the main flow as a measurement flow;
a flow rate sensor that is disposed in the bypass passage, the flow rate sensor measuring a flow rate of the measurement flow flowing through the bypass passage; and
a measurement body that is disposed inside the duct, the measurement body defining the bypass passage, wherein
the measurement body includes:
a measurement flow inlet that is open toward an upstream side of the duct, the measurement flow inlet guiding the measurement flow to the bypass passage;
a measurement flow outlet that is open toward a downstream side of the duct to discharge the measurement flow; and
a cylindrical portion that is disposed to cover the measurement flow outlet, the cylindrical portion including an outer circumferential surface, which guides the main flow, and an inner circumferential surface, which guides the measurement flow,
the cylindrical portion includes a waveform portion that is formed in an edge side of an opening of the cylindrical,
the waveform portion has a shape that divides the main flow guided by the cylindrical portion into a plurality of main flows and that divides the measurement flow guided by the cylindrical portion into a plurality of measurement flows,
the waveform portion is formed of a plurality of protrusions, which protrude toward the downstream side of the duct in the axial direction, and a plurality of recessed portions, which are recessed in the axial direction,
the plurality of protrusions and the plurality of recessed portions are alternately connected to each other,
the plurality of protrusions have different shapes from each other, and
the plurality of recessed portions have different shapes from each other.

\* \* \* \* \*